(12) United States Patent
Linn et al.

(10) Patent No.: US 12,728,577 B2
(45) Date of Patent: Sep. 8, 2026

(54) SUPPORT FOR A WATERCRAFT

(71) Applicant: Choice Equipment Company, LLC, Jefferson, GA (US)

(72) Inventors: Chad Linn, Jefferson, GA (US); Joseph Bova, Jefferson, GA (US)

(73) Assignee: Choice Equipment Company, LLC, Jefferson, GA (US)

( * ) Notice: Subject to any disclaimer, the term of this patent is extended or adjusted under 35 U.S.C. 154(b) by 301 days.

(21) Appl. No.: 18/638,184

(22) Filed: Apr. 17, 2024

(65) Prior Publication Data

US 2025/0326174 A1 Oct. 23, 2025

(51) Int. Cl.
*B29C 48/09* (2019.01)
*B29C 48/00* (2019.01)
*B29C 48/12* (2019.01)

(52) U.S. Cl.
CPC ............ *B29C 48/09* (2019.02); *B29C 48/022* (2019.02); *B29C 48/12* (2019.02)

(58) Field of Classification Search
CPC ....... B29C 48/09; B29C 48/022; B29C 48/12; B60P 3/1066; B63C 3/02
See application file for complete search history.

(56) References Cited

U.S. PATENT DOCUMENTS 6,651,997 B2 * 11/2003 Higginson ............ B60P 3/1066 384/42
7,413,209 B2 * 8/2008 MacKarvich ......... B60P 3/1066 280/43.11
7,690,161 B2 * 4/2010 McPherson ........... F16B 37/045 52/364
7,828,316 B1 * 11/2010 Joseph .................. B60P 3/1058 280/414.1
8,794,870 B2 * 8/2014 Basta .................... F16B 7/1472 405/3
9,446,824 B2 * 9/2016 Swart ........................ B63C 3/00
10,654,548 B2 * 5/2020 Hewitt ...................... B63C 3/06
11,623,556 B2 * 4/2023 MacCready .......... B60P 3/1041 296/100.12
2002/0034629 A1 * 3/2002 Jones ...................... B29C 48/33 428/512
2003/0042704 A1 * 3/2003 Higginson ............ B60P 3/1066 280/414.1
2007/0045984 A1 * 3/2007 Remedios ............. B60P 3/1066 280/414.1
2015/0158566 A1 * 6/2015 Doig ....................... B29C 48/12 405/7
2022/0072989 A1 * 3/2022 MacCready ......... B62D 65/024

* cited by examiner

*Primary Examiner* — Valentin Neacsu
*Assistant Examiner* — Marlon A Arce

(57) ABSTRACT

A support includes a frame defining a first engagement point and a second engagement point. An extrusion member is formed as a single continuous component and includes a plate portion, a first channel formed on a first side of the plate portion, a second channel formed on the first side of the plate portion, a first lock member formed on a second side of the plate portion, and a second lock member formed on the second side of the plate portion. The first channel engages the first engagement point and the second channel engages the second engagement point to attach the extrusion member to the frame. A board includes a first slot and a second slot, the first slot engaged with the first lock member and the second slot engaged with the second lock member to attach the board to the extrusion member.

20 Claims, 4 Drawing Sheets

SUPPORT FOR A WATERCRAFT

BACKGROUND

Supports such as lifts and trailers are commonly used to transport or store objects. Trailers are common transportation devices that attach to other vehicles to allow for towing of objects supported on the support. Often, the objects include watercraft such as boats and personal watercraft. When used for a boat, the support is periodically submerged in water which can damage some components of the support over time.

SUMMARY

In one aspect, a support includes a frame defining a first engagement point and a second engagement point. An extrusion member is formed as a single continuous component and includes a plate portion, a first channel formed on a first side of the plate portion, a second channel formed on the first side of the plate portion, a first lock member formed on a second side of the plate portion, and a second lock member formed on the second side of the plate portion. The first channel engages the first engagement point and the second channel engages the second engagement point to attach the extrusion member to the frame. A board includes a first slot and a second slot, the first slot engaged with the first lock member and the second slot engaged with the second lock member to attach the board to the extrusion member.

In another aspect, a support includes a frame formed to support an object, a first engagement point connected to the support, and a second engagement point connected to the support. The support also includes an extrusion member defining a longitudinal axis and having a length along the longitudinal axis. The extrusion member includes a plate portion defining a first side and a second side and a first channel formed on the first side of the plate portion and extending parallel to the longitudinal axis and defining a first engagement face. The first channel is coupled to the first engagement point. A second channel extends parallel to the longitudinal axis and defines a second engagement face, the second channel coupled to the second engagement point. A first lock member is formed on the second side of the plate portion, and a second lock member is formed on the second side of the plate portion. The support also includes a board including a first lock receiving member and a second lock receiving member, the first lock member engaged with the first lock receiving member and the second lock member engaged with the second lock receiving member to connect the board to the extrusion member, the board operable to support the object.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

It should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element, or that the element is in contact with the further portion, unless the context clearly indicates otherwise.

Figure 1:
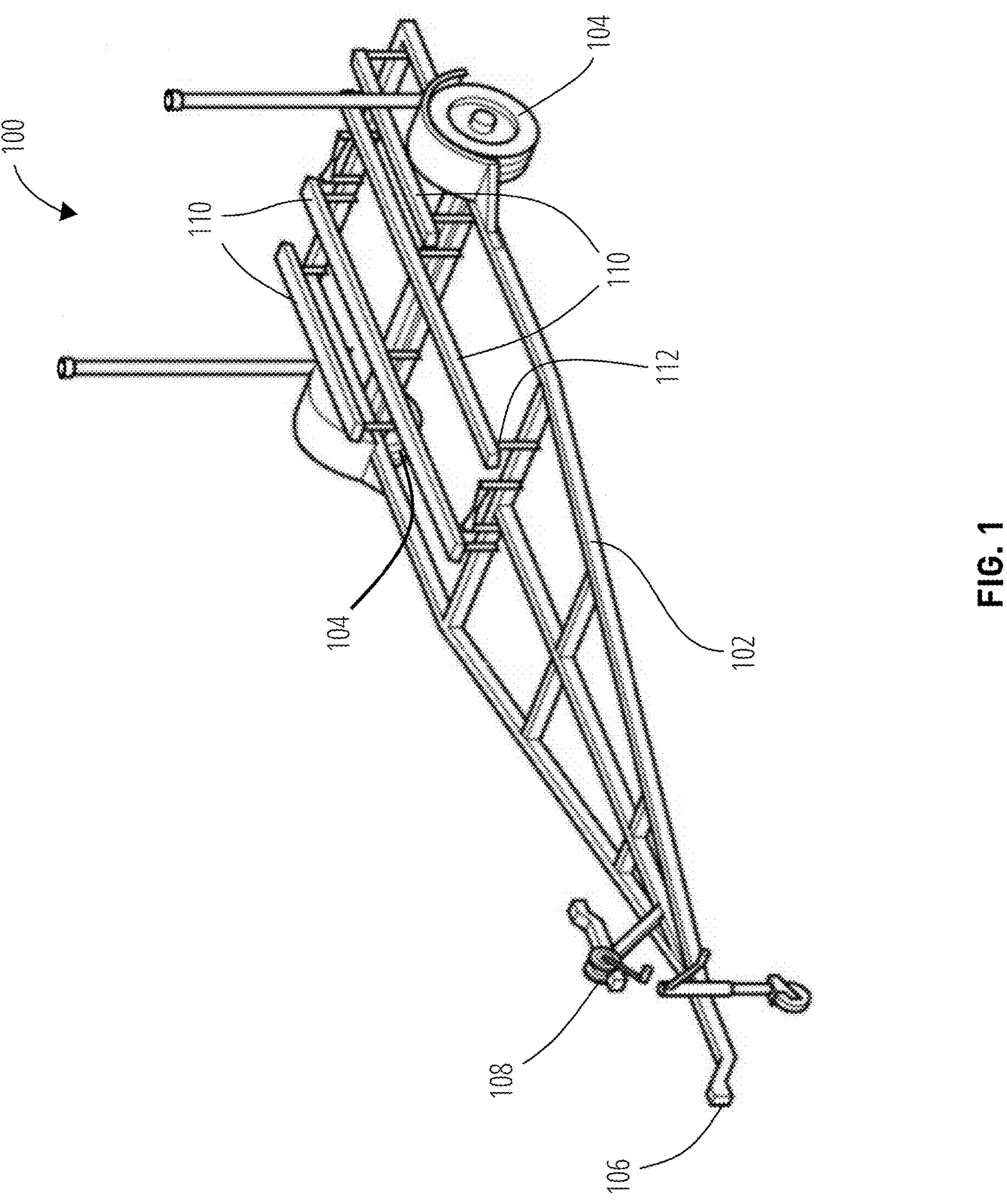
FIG. 1 is a perspective view of a support in the form a trailer including a support board assembly.

FIG. 1 illustrates a support in the form of a trailer 100 that includes a frame 102 that is supported by two wheels 104. A tongue 106 is coupled to or formed as part of the frame 102 and includes a connection mechanism that allows for the connection of the support to another vehicle for towing. Typically, the connection mechanism includes the socket portion of a ball and socket joint with other arrangements being possible. A winch 108 is often connected to the frame 102 to facilitate the proper positioning of an object onto the support. Typical objects include boats, personal watercraft, and the like.

Support board assemblies 110 are connected to the frame 102 via engagement points 112 and are arranged and positioned to properly support the particular object for which the support is designed. For boats, the support board assemblies 110 generally include flat or slightly curved surfaces that are supported at angles that match the desired contact points on the hull of the boat. In most arrangements, two support board assemblies 110 are employed with the arrangement of FIG. 1 including four support board assemblies 110. The quantity and length of the various support board assemblies 110 is selected based on the features (e.g., length, width, weight, etc.) of the object being supported.

In the illustrated construction, the frame 102 includes two or three engagement points 112 for each of the support board assemblies 110. The engagement points 112 may include fasteners, such as shoulder bolts or other arrangements selected to engage the support board assemblies 110 as required to maintain their position with respect to the support.

In prior designs, each support board assembly 110 included a wooden board that was often covered with a soft material such as carpet. The repeated loading and unloading of the object as well as the periodic submergence in water caused damage to both the wood and the carpet, making it necessary to replace or repair the support board assemblies 110 periodically.

While FIG. 1 illustrates a support in the form of a trailer 100. Other supports may include a boat or watercraft lift 200 as illustrated in FIG. 2.

Figure 2:
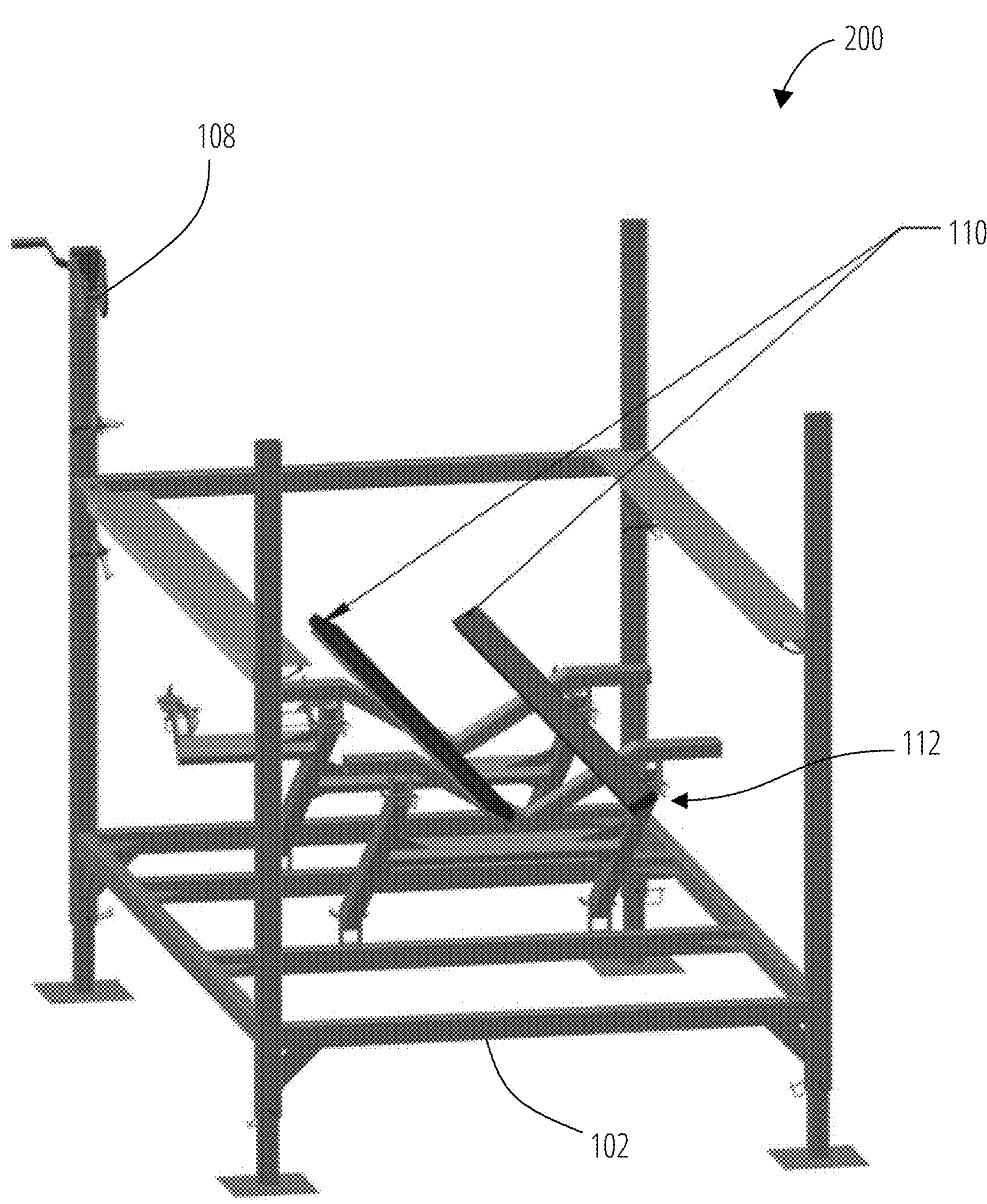
FIG. 2 is a perspective view of a support in the form a lift including a support board assembly.

FIG. 2 illustrates a support in the form of a watercraft lift 200. The watercraft lift 200 includes a frame 102 that provides a base and the necessary support for the particular watercraft being supported. Typical frames 102 are formed from structural steel, aluminum, or other suitable materials. The frame 102 defines a plurality of engagement points 112 that each partially support one or more support board assemblies 110.

The support board assemblies 110 are similar to those described above and may be supported on a movable portion of the frame 102 or a stationary portion of the frame 102. The support board assemblies 110 are arranged to engage the hull of the watercraft and in arrangements in which the frame 102 includes a movable portion, may move into and out of the water. In use, the watercraft is floated into position above the support board assemblies 110 and the support board assemblies 110 are moved to lift the watercraft partially or completely out of the water.

Figure 3:
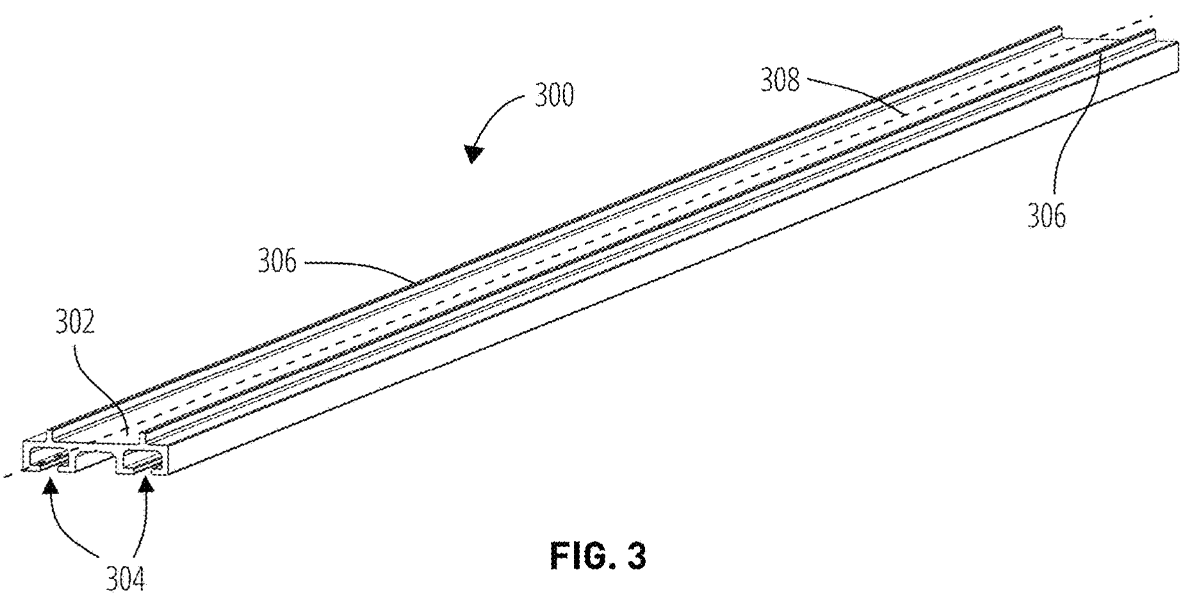
FIG. 3 is a perspective view of an extrusion member which forms part of the support board assembly of FIG. 1 or FIG. 2.

FIG. 3 illustrates an extrusion member 300 which forms part of each of the support board assemblies 110. The extrusion member 300 includes a plate portion 302, two channels 304, and two lock members 306. In preferred arrangements, the extrusion member 300 is formed as a single continuous component. In one arrangement it is formed using an extrusion process which results in a uniform cross-section along the entire length when viewed normal to a longitudinal axis 308 (the extrusion axis). Any suitable material can be used to form the extrusion member 300 with aluminum being one possible option. In other constructions, an assembled extrusion member 300 could be employed. For example, the channels 304 or the lock members 306 could be attached to the plate portion 302 using common fasteners, welding, or additive manufacturing processes. The actual method of manufacturing used is not critical to the operation of the extrusion member 300.

It should also be noted that while the illustrated construction includes two channels 304 and two lock members 306 that each extend the full length of extrusion member 300, other arrangements could employ fewer or more channels 304 or lock members 306 or could employ channels 304 and/or lock members 306 that do not extend the full length of the extrusion member 300.

Figure 4:
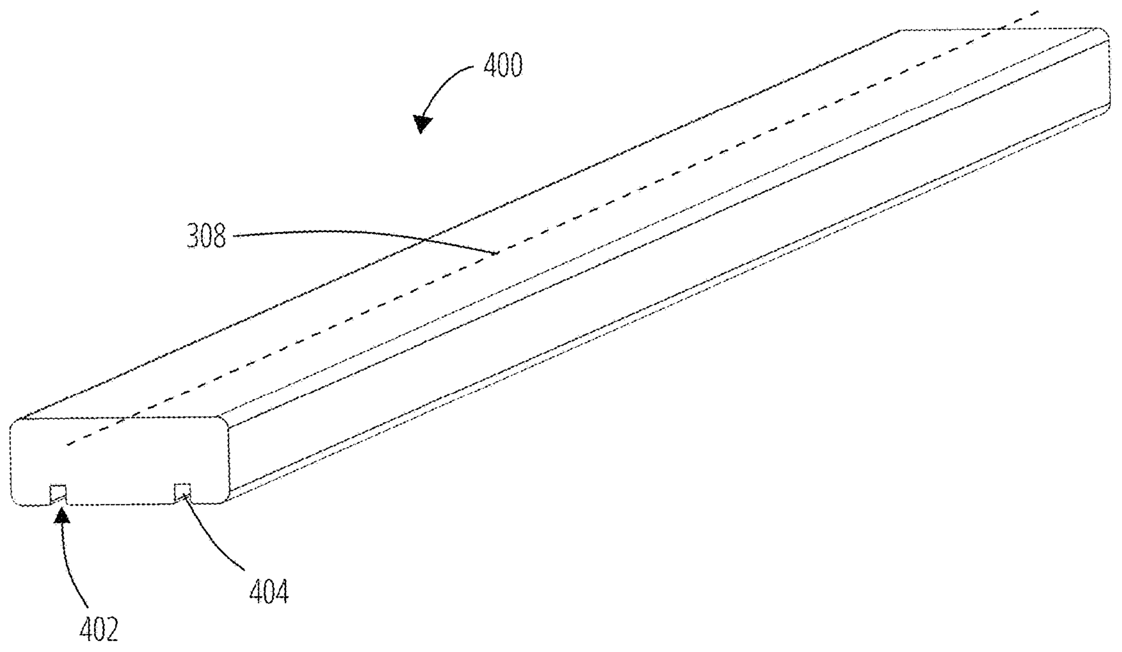
FIG. 4 is a perspective view of a board which forms part of the support board assembly of FIG. 1 or FIG. 2.

FIG. 4 illustrates a board 400 which forms part of each of the support board assemblies 110. The board 400 has a substantially rectangular cross section taken normal to the longitudinal axis 308 that extends the full length of the board 400. Two lock receiving members 402, each including slots 404 are formed as part of the board 400.

Each slot 404 has a rectangular cross section that corresponds to the shape of the lock members 306. In the illustrated construction, the lock members 306 extend parallel to the longitudinal axis 308 and the slots 404 also extend parallel to the longitudinal axis 308 to allow engagement of the lock members 306 and the slots 404.

It should be noted that the number, shape, and orientation of the slots 404 is selected to match the number, shape, and orientation of the lock members 306. Additional attachment means such as pins, fasteners, and the like may also be employed to facilitate the attachment of the board 400 to the extrusion member 300.

In preferred arrangements, each board 400 is formed from a thermoplastic material such as high density polyethylene (HDPE). Of course, other materials, including wood could be employed to form the board 400. In addition, a covering material, such as carpet could also be used if desired.

Figure 5:
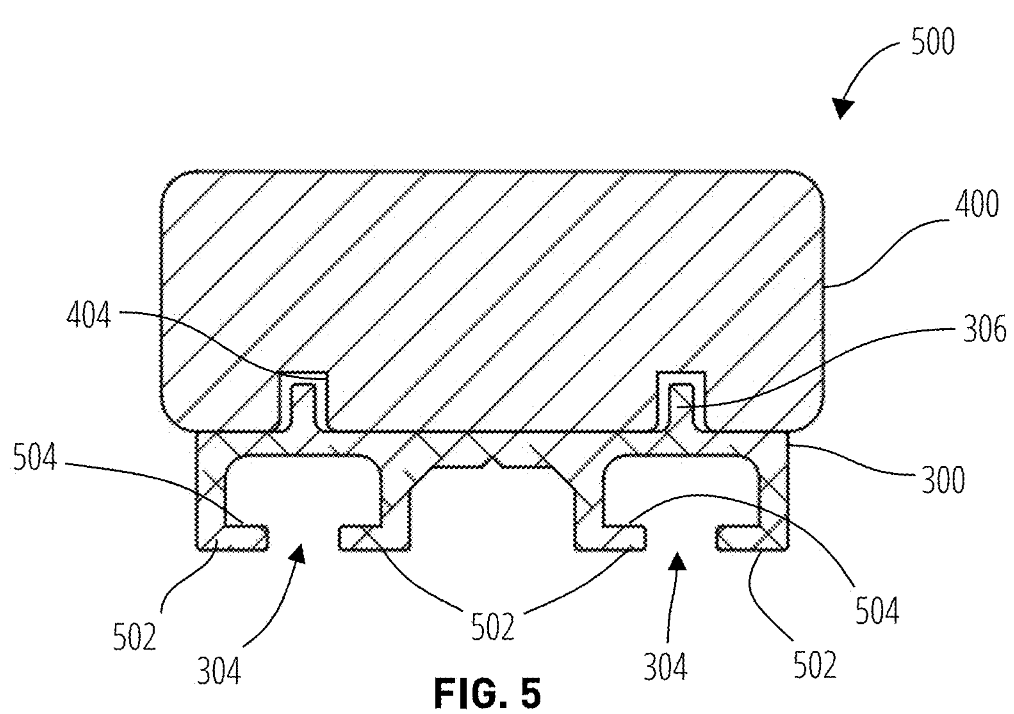
FIG. 5 is a cross-sectional view of one arrangement of a support board assembly suitable for use on the support of FIG. 1 or FIG. 2.

FIG. 5 illustrates a first arrangement of a support board assembly 500 suitable for use on the trailer 100 of FIG. 1 and/or the watercraft lift 200. The lock members 306 of the extrusion member 300 engage the slots 404 of the board 400 to attach the board 400 to the extrusion member 300. Of course, additional fasteners or connection means could be employed to enhance the attachment between the board 400 and the extrusion member 300.

Each channel 304 is formed from two legs 502 that extend from the plate portion 302 on a side opposite the lock members 306. Each leg 502 includes a hook portion that defines an engagement face 504. The engagement face 504 extends parallel to the longitudinal axis 308 and is arranged to engage the engagement points 112. For example, one arrangement uses engagement points 112 that include fasteners such as shoulder bolts (shown in FIG. 6) that can be tightened to complete the attachment of the extrusion member 300 to the frame 102.

In the arrangement of FIG. 5, the width of the board 400 is slightly greater than the width of the extrusion member 300. Of course, other arrangements could select different widths, or thicknesses for the board 400.

Figure 6:
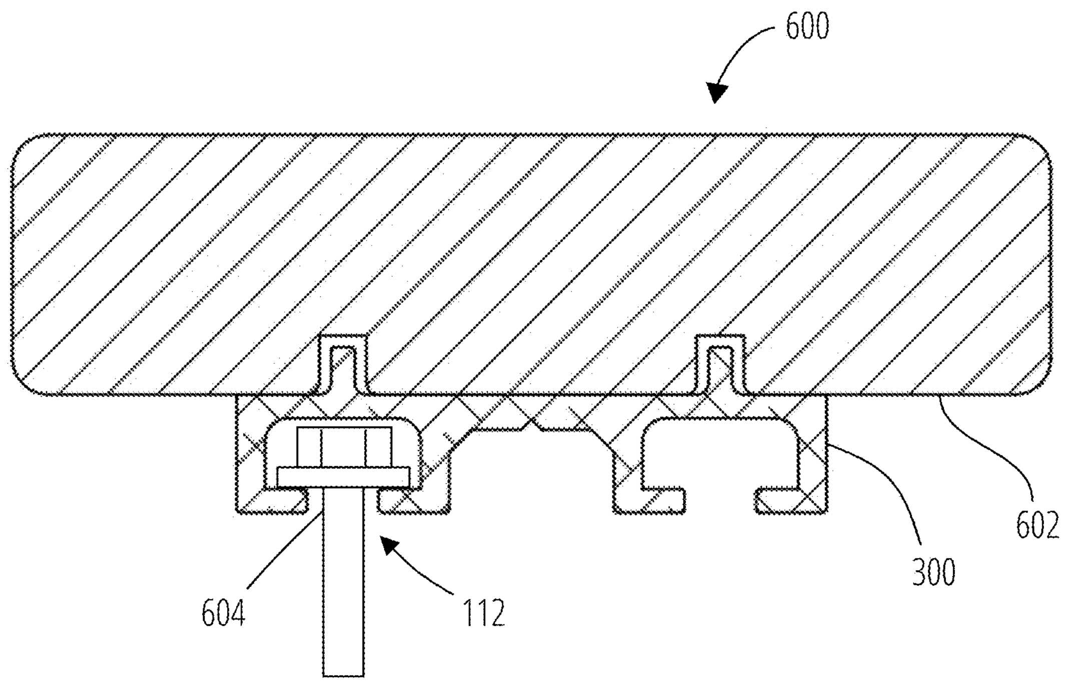
FIG. 6 is a cross-sectional view of another arrangement of a support board assembly suitable for use on the support of FIG. 1 or FIG. 2.

FIG. 6 illustrates another arrangement of a support board assembly 600 including the extrusion member 300 illustrated in FIG. 3 and FIG. 5 attached to a wider board 602. With the exception of the width of the board 602, the arrangement of the support board assembly 600 of FIG. 6 is identical to the arrangement of FIG. 5.

FIG. 6 illustrates an example of an engagement point 112 that includes a fastener 604. The fastener 604 includes a shoulder or washer that engages the engagement face 504 of its respective channel 304 to complete the attachment of the extrusion member 300 to the frame 102 of the trailer 100 or the watercraft lift 200.

It should be noted that for all the arrangements illustrated herein, the location of the lock member 306 on the extrusion member 300 and the lock receiving member 402 on the board 400 could be reversed such that the lock member 306 is located on the board 400 and the lock receiving member 402 is formed as part of the extrusion member 300. Similarly, the channels 304 could be formed as part of the trailer 100 with the extrusion member 300 including the engagement points 112.

To attach the extrusion member 300 to a trailer 100 or a watercraft lift 200, the user first removes the original boards. The extrusion member 300, and specifically the channels 304 slide over the various engagement points 112 to position the extrusion member 300 in the desired position. Once positioned, if the engagement points 112 include fasteners 604, the fasteners 604 are tightened. Other arrangements may include one or more wedges or other arrangements that fix the position of the extrusion member 300 with respect to the frame 102 of the trailer 100 or the watercraft lift 200. Next, the board 400 is positioned on the extrusion member 300 such that the lock receiving member 402, or slot 404 as illustrated herein receives the lock member 306 to position the board 400 with respect to the extrusion member 300. If employed, additional fasteners or devices could further attach the board 400, 602 to the extrusion member 300.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A support comprising:

a frame defining a first engagement point and a second engagement point;

an extrusion member formed as a single continuous component and including a plate portion, a first channel formed on a first side of the plate portion, a second channel formed on the first side of the plate portion, a first lock member formed on a second side of the plate portion, and a second lock member formed on the second side of the plate portion, the first channel engaged with the first engagement point and the second channel engaged with the second engagement point to attach the extrusion member to the frame;

a board having a rectangular cross section that defines a first wide surface and a second wide surface parallel to the first wide surface, the first wide surface including a first slot and a second slot formed therein, the first slot engaged with the first lock member and the second slot engaged with the second lock member to attach the board to the extrusion member, wherein the first wide surface engages the plate portion.

2. The support of claim 1, wherein each engagement point includes a fastener that is movable to fixedly attach the extrusion member to the frame.

3. The support of claim 2, wherein the first channel includes an engagement face and wherein two fasteners engage the engagement face.

4. The support of claim 1, wherein the first lock member has a rectangular cross-section normal to a longitudinal axis of the extrusion member and extends the full length of the extrusion member.

5. The support of claim 4, wherein the first slot has a rectangular cross-section normal to a longitudinal axis of the extrusion member and extends the full length of the extrusion member.

6. The support of claim 1, wherein the first lock member and the second lock member each extend parallel to a longitudinal axis of the extrusion member.

7. The support of claim 1, wherein the first channel includes a first leg and a second leg that cooperates with the first leg to define an engagement face, the engagement face engaged with the first engagement point.

8. The support of claim 1, wherein the board is formed from a thermo-plastic material.

9. The support of claim 1, wherein the board is formed from a high density polyethylene (HDPE) material.

10. The support of claim 1, wherein the support is a trailer and includes two wheels and a tongue.

11. A support comprising:

a frame formed to support an object;

a first engagement point connected to the support;

a second engagement point connected to the support;

an extrusion member defining a longitudinal axis and having a length along the longitudinal axis, the extrusion member including:

a plate portion defining a first side and a second side;

a first channel formed on the first side of the plate portion and extending parallel to the longitudinal axis and defining a first engagement face, the first channel coupled to the first engagement point;

a second channel extending parallel to the longitudinal axis and defining a second engagement face, the second channel coupled to the second engagement point;

a first lock member formed on the second side of the plate portion; and a second lock member formed on the second side of the plate portion; and a board having a rectangular cross section that defines a first wide surface and a second wide surface parallel to the first wide surface, the first wide surface including a first lock receiving member and a second lock receiving member, the first lock member engaged with the first lock receiving member and the second lock member engaged with the second lock receiving member to connect the first wide surface of the board to the plate portion of the extrusion member, the second wide surface of the board operable to support the object.

12. The support of claim 11, wherein the first engagement point and the second engagement point each includes a fastener that is movable to fixedly attach the extrusion member to the frame.

13. The support of claim 11, wherein the first lock member has a rectangular cross-section normal to a longitudinal axis of the extrusion member and extends the full length of the extrusion member.

14. The support of claim 13, wherein the first lock receiving member includes a first slot that has a rectangular cross-section normal to the longitudinal axis of the extrusion member and extends the full length of the extrusion member.

15. The support of claim 11, wherein the first lock member and the second lock member each extend parallel to a longitudinal axis of the extrusion member.

16. The support of claim 11, wherein the first channel includes a first leg and a second leg that cooperates with the first leg to define the first engagement face, the first engagement face engaged with the first engagement point.

17. The support of claim 11, wherein the board is formed from a thermo-plastic material.

18. The support of claim 11, wherein the board is formed from a high density polyethylene (HDPE) material.

19. The support of claim 11, wherein the board is made of wood.

20. The support of claim 11, wherein the plate portion, the first channel, the second channel, the first lock member, and the second lock member are formed as a single continuous component.

* * * * *